(12) United States Patent
Essling

(10) Patent No.: US 7,724,352 B2
(45) Date of Patent: May 25, 2010

(54) LIGHT BEAM RECEIVER

(75) Inventor: Mirko Essling, Kaiserslautern (DE)

(73) Assignee: AndroTec GmbH, Waldfischbach-Burgalben (DE)

(*) Notice: Subject to any disclaimer, the term of this patent is extended or adjusted under 35 U.S.C. 154(b) by 381 days.

(21) Appl. No.: 11/666,596

(22) PCT Filed: Nov. 3, 2005

(86) PCT No.: PCT/DE2005/001989
§ 371 (c)(1),
(2), (4) Date: Apr. 27, 2007

(87) PCT Pub. No.: WO2006/048007
PCT Pub. Date: May 11, 2006

(65) Prior Publication Data
US 2009/0046269 A1 Feb. 19, 2009

(30) Foreign Application Priority Data
Nov. 3, 2004 (DE) .................. 10 2004 053 686

(51) Int. Cl.
*G01C 3/08* (2006.01)
(52) U.S. Cl. ............ 356/4.01; 356/3.01; 356/3.1; 356/4.1; 250/339.02
(58) Field of Classification Search ....... 356/3.01–3.15, 356/4.01–4.1, 5.01–5.15, 6–22, 28, 28.5
See application file for complete search history.

(56) References Cited

U.S. PATENT DOCUMENTS

| | | | |
|---|---|---|---|
| 2,830,487 A | 4/1958 | Griffith | |
| 3,687,556 A | 8/1972 | Price et al. | |
| 4,030,832 A | * | 6/1977 | Rando et al. ............ 356/4.08 |
| 4,268,167 A | 5/1981 | Alderman | |

(Continued)

FOREIGN PATENT DOCUMENTS

CA    11-64751    3/1999

(Continued)

OTHER PUBLICATIONS

Saleh et al., "Fundamentals of Photonics," A Wiley-Interscience Publication, pp. 5-6 and 296-297 (1991).

(Continued)

*Primary Examiner*—Thomas H Tarcza
*Assistant Examiner*—Luke D Ratcliffe
(74) *Attorney, Agent, or Firm*—Frederick H. Gribbell

(57) ABSTRACT

A light beam receiver includes a plurality of light beam detector elements, a plurality of integrator circuits that receive signals from the light beam detector elements, and a signal integral limiting integration time controller that is in communication with at least two of the integrator circuits so that an analysis of the light beam reception is determined. One embodiment provides a self-calibration function, using a plurality of light beam detector elements that generate output signals when receiving a light beam upon the light beam detector elements, an evaluation/control circuit that receives the output signals and is configured to substantially determine a position where the light beam impacts on the light beam detector elements, and at least one calibration light source that emits at least one light pulse that is coupled to the light beam detector elements. The light beam receiver performs a self-calibration function using the calibration light source.

26 Claims, 6 Drawing Sheets

U.S. PATENT DOCUMENTS

| | | | |
|---|---|---|---|
| 4,573,783 A * | 3/1986 | Maruyama | 396/106 |
| 4,818,107 A | 4/1989 | Ono et al. | |
| 4,857,717 A * | 8/1989 | Chino | 250/201.2 |
| 4,907,874 A | 3/1990 | Ake | |
| 4,911,548 A | 3/1990 | Keren-Gill | |
| 4,926,050 A | 5/1990 | Shemwell | |
| 5,110,202 A | 5/1992 | Dornbusch et al. | |
| 5,189,484 A | 2/1993 | Koschmann et al. | |
| 5,243,397 A | 9/1993 | Friedland | |
| 5,247,487 A | 9/1993 | Beliveau et al. | |
| 5,619,262 A * | 4/1997 | Uno | 348/297 |
| 5,742,069 A | 4/1998 | Steenwyk et al. | |
| 5,742,394 A | 4/1998 | Hansen | |
| 5,949,530 A | 9/1999 | Wetteborn | |
| 6,066,846 A | 5/2000 | Takada et al. | |
| 6,166,802 A | 12/2000 | Kodaira et al. | |
| 6,292,258 B1 | 9/2001 | D'Alessandro et al. | |
| 6,337,473 B2 | 1/2002 | Yamazaki et al. | |
| 6,366,395 B1 | 4/2002 | Drake et al. | |
| 6,396,571 B2 | 5/2002 | Ohtomo et al. | |
| 6,473,167 B1 | 10/2002 | Odell | |
| 6,545,751 B2 | 4/2003 | Beliveau et al. | |
| 6,573,981 B2 | 6/2003 | Kumagai et al. | |
| 6,618,133 B2 | 9/2003 | Hedges et al. | |
| 6,665,067 B2 | 12/2003 | Ogawa et al. | |
| 7,064,817 B1 * | 6/2006 | Schmitt et al. | 356/139.03 |
| 2003/0174305 A1 * | 9/2003 | Kasper et al. | 356/3.09 |

FOREIGN PATENT DOCUMENTS

WO    WO 02/10681    2/2002

OTHER PUBLICATIONS

International Search Report, PCT/EP01/08841, 6 pages (Nov. 2001).
International Search Report, PCT/DE2005/001989, 6 pp. (Mar. 2006).

* cited by examiner

LIGHT BEAM RECEIVER

This invention relates to what is claimed in the independent claims and therefore to a light beam receiver.

Light beam receivers are required where light beams are used for surveying. A typical application is the rotary lasers used on construction sites and similar. Similar to a lighthouse, they emit a beam which continuously circulates in one plane. If the axis of rotation of the rotary laser is correctly aligned, this plane is horizontal and an elevation relative to this plane can be determined at any point reached by the laser beam. For this it is necessary for the elevation of the laser beam to be detected with sufficient accuracy. Light beam receivers are intended to provide such beam detection.

In typical laser beam receivers it is therefore desirable to determine an exact elevation, and if necessary another analysis can be carried out. Typically several detector elements, spaced a certain distance apart, are provided in the light beam receiver for the desired signal generation, and the beam elevation is determined from the distribution of the light onto these detector elements. It is possible to design the light beam detector elements as position-sensitive elements. Thus photo-detectors may, in particular, be arranged as light beam detector elements on the end faces of a transparent rod which conducts light from a point of incidence to it. The position of the point of incidence between the photo-detectors may then be determined from the strength of the detector signal received. In principle such devices are known from prior property rights of the applicant, in particular from PCT/EP 01/08841, the disclosure of which is incorporated to its full extent here by reference.

Although such devices are already much cheaper than detector lines, for example, for linear elevation measurement, e.g., according to U.S. Pat. No. 5,471,049, it is desirable to further improve the said device. Thus if the light beam is coupled close to one end of the light rod, over-modulation may occur on the light detector elements or in the subsequent amplifier stages. Prior methods for avoiding this problem included the application of high operating voltages and of amplifier stages or integrators with an adjustable amplification. However, higher operating voltage results in a higher energy consumption and hence in a shorter battery life. The disadvantage of adjustable amplifier stages is that because of synchronisation problems with the different amplifiers, linearity problems may arise. It can also happen that measured values are unusable when searching for an optimum amplification setting.

It is desirable to provide an improved light beam receiver device.

The object of this invention is to provide a new development for commercial application. Advantageous embodiments are described in the dependent claims.

In a first basic concept, this invention proposes light beam receivers for analyzing light beam reception with a detector device consisting of several light beam detector elements and integrators for light beam element based signals, in which provision is made for a signal integral limiting continuous integration control system to be assigned to the integrator or integrators for at least two light beam detector elements, so that light beam reception is analyzed in response to integrator signals evaluated in relation to each other.

A first fact on which the invention is based may therefore be seen in the fact that over-modulation conditions and similar that impair measuring accuracy can be avoided without significant loss of precision because the signal is integrated for a given time, the time during which it is integrated being determined by the intensity of the irradiated light, particularly the integral, i.e., the time mediated or integrated intensity. By preventing the integrator from overrunning, saturating or falling within a non-linear range, despite a high total amplification, an excessively high operating voltage is, on the one hand, not necessary to avoid overmodulations, but on the other hand it is still ensured that a high dynamic circumference is provided, i.e., it can be measured both in the immediate vicinity of a rotary laser, albeit only for a short time, and at a greater distance from it, over a longer period, where the light intensity per unit of area has already significantly decreased by dispersion and beam widening.

In principle, it would be possible to use the time determined on each integrator up to its maximum permissible modulation as integrator signals to be evaluated, and to relate these specific times for several integrators. However, it is preferable for the signal integral limiting continuous integration control to be provided so that the integrators can be switched on and off simultaneously and so that it is not the integration time until a maximum permissible modulation is reached that need be used, but rather the integral itself serves as the measured value. This is particularly advantageous when a beam has already become so weak that full modulation of at least one integrator is no longer achieved during a single beam passage. Although not essential, light beam detector elements may be arranged at opposite ends of a light conducting rod, whereby the point of incidence can be determined from the light intensity on each light beam detector element.

In a particularly preferred variant, a light-emitting calibration source is provided by means of which pulse-type light, in particular, can be coupled into the detector device. It is also conceivable to couple only one calibration pulse electronically into the combination of amplifiers. Because of this there may be a further deviation of the amplification factor, and even a time or temperature-dependent drift of the detector elements relative to each other, or similar, can easily be compensated for in the case of a light-emitting calibration source.

When use is made of two separated light-emitting calibration sources, which are installed on a temperature-stable length standard, it is even possible to compensate during operation for changes in the receiver behavior due to temperature fluctuations or ageing.

It is emphasised that the use of calibration sources for the purpose of continuous self-calibration is advantageous and, as applicable, also inventive for other applications in the field of laser beam detection of rotary lasers of prior state of the art.

In principle, it is possible to receive continuous light beams with the light beam receiver, for instance when an individual point is illuminated from a greater distance with a laser light beam or a laser line, and the beam position is to be determined exactly with the light beam receiver. In typical applications, however, the light beam is received repetitively for a short time, which is the case in particular when it is emitted from a rotary, in particular a modulated linear and/or scanning laser light source, such as that normally represented by a construction laser. The evaluation circuit may be designed specially for this purpose. The special design for receiving a repetitively temporarily received light beam may, in particular, constitute a system for synchronisation to an at least adequately precise, constant repetition rate; here it is possible to switch off part of the circuit during those phases in which a light beam is not expected in order to save energy. Mention may be made of the possibility of a synchronisation adaptation for a starting phase, for example, during which the rotation is accelerated.

Limitation of the integration time according to the invention will, in particular, prevent an integrator from overrunning. This is achieved when further application of a signal to the integrator input is prevented beginning at a certain integrator level, i.e., a certain integrated signal intensity. However, it has not yet been established when the process of integrating a signal has to start.

It is now particularly advantageous for the center of the signal passage always to be evaluated. This is because of the fact that laser light beams emitted by construction lasers or similar need not necessarily be circular in shape, but rather they may be ellipsoid, for example. This remains insignificant as long as an approximately ellipsoid beam with a large semi-axis is received either parallel to the connection line of the detector elements or perpendicular to it. Understandably, however, a highly oblique, non-round beam profile is critical. For example, if the proposal is for such an extremely widely expanded beam of which the lower end first hits the lower detector and the trailing edge then hits the upper detector, the beam is initially very intensive at the top, which is why the lower detector responds first, and the integrator exceeds the threshold even before significant portions of the light arrive at the upper detector. This leads to a situation where the beam is regarded as probably too low. However, if the device ensures, through suitable means, that measurement is carried out exactly in the center of the beam passage, this error is avoided. It is understandable that it is therefore advantageous for the evaluation circuit to be designed for an at least approximately time-symmetrical signal integration relative to the central beam passage. This can be achieved by delaying the start of integration relative to a rising edge or by varying the integration initiating signal elevation on the edge.

It is also understandable that the light beam detector element signal need not be directly integrated. Instead, amplification and/or frequency filter stages may, in particular, also be arranged in front of the integrators in order to provide the signals, from photodiodes as detector elements, with sufficient initial amplification and to filter out frequencies such as those observable, for example in artificially-lit rooms.

In the particular case of repetitive laser light signals and light beam receivers that are only moved slowly against the repetition frequency, it would be possible to provide a single integrator and initially switch a first detector to the integrator input during a first beam passage by means of a multiplexer circuit, for example, and in doing so, to determine the maximum permissible integration time, and then, during a second beam passage, switching a second detector for exactly the same predetermined time to the integrator that has been selected and reset in the meantime, assuming that no major shifts and variations of other kinds have taken place. This is recorded as the presence of several integrators that exist at least virtually, because they are staggered in time. However, it is preferable in any case for each detector to be assigned its own integrator because on one hand this makes more complicated multiplexer circuits and similar unnecessary, and on the other also provides for a faster, more error-free measurement.

If, as preferred, at least two real integrators are provided, they may be synchronized so that they can be jointly activated and/or deactivated. Mention should also be made of the possibility of carrying out separate activation instead of the joint activation/deactivation of separate integrators. Here provision may be made for determining the relevant time up to which the integrator overruns. The signal strength on the detector can also be determined from this time, which also represents an integrator signal, so that a beam elevation or similar can be determined, if necessary, by time measurement and the formation of a time ratio alone.

It is preferable to assign to the integrator a gate control which only temporarily and/or conditionally allows through the signals to be fed to the integrator and integrated by it, particularly when a signal integration is to be carried out around the center of the beam passage, i.e., the integration of the detector signals is to take place not merely when the beam begins to arrive. Here the gate control is able to take into consideration, in particular, earlier gate opening times and/or repetition frequencies of the light beams.

While it is possible, in principle, to carry out an integration over several beam passages, particularly in the case of repetitive signals, it is still preferable, in particular, to design the amplification of the detector signals etc. so high that that the integration times are short against the irradiation times, even in the case of weak beams. It should also be pointed out that if certain threshold values on the integrator are not exceeded, the signals determined with it may possibly nevertheless be evaluated. Thus full magnitude on the integrator is not absolutely essential in all cases. For instance, it is possible to test, even if a threshold is not reached, whether the signals still received are regarded as at least sufficient to determine a beam position or similar, if necessary at least with reduced evaluation accuracy.

The evaluation means will typically perform the analysis, which may, in particular, include a determination of a beam elevation or of the elevation and position of incidence between the detector elements. It is pointed out that the integrator values should preferably be in digitalized form for the analysis, which can be achieved, for example, by providing the evaluation means with one or several analog/digital converters. Furthermore, the evaluation means may be designed to determine the beam center, i.e., it can record the time when the beam lies exactly symmetrically on the elements. This information can preferably be evaluated for subsequent beam passages. Mention is made of the possibility of rendering another region selectable instead of the exact signal center. This may be advantageous if the filter stages cause a signal to ring at the filter output in the case of correspondingly slow signals, i.e., when they generate a signal that passes through zero and thus two probable maxima are recorded.

The analysis of the light beam reception may, particularly for beam elevation determination, utilize the differences, the quotients or the quotients of differences and totals of the integrator signals, and different integrator signals that may be required according to the calibration, for the analysis. Alternatively other forms of an evaluation system may be implemented, e.g., by suitable hardware design of the evaluation circuits, which may be purely analog if necessary.

Protection is similarly claimed for a measuring method in which signals are integrated for a limited time, the integration time depending on the signal strength and the integral then being used to analyze beam center elevation, points of incidence and similar.

Examples of the invention are described in the following, with reference to the drawing, in which.

Figure 2:
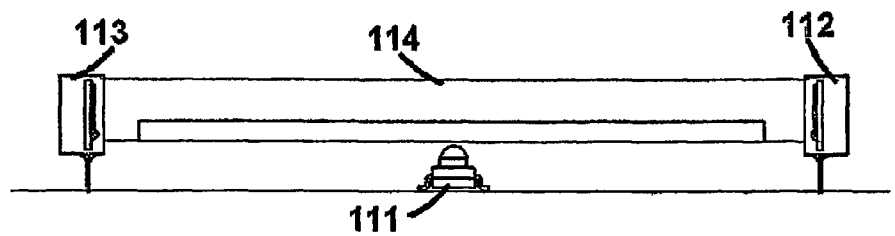
Figure 3:
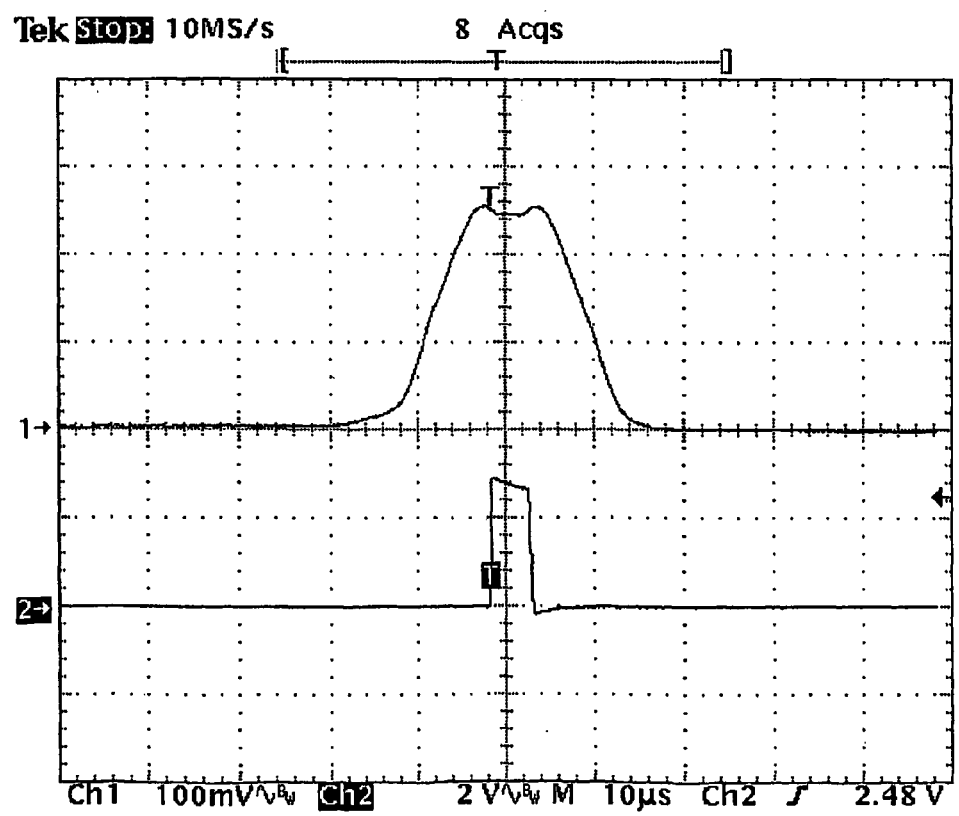
Figure 4:
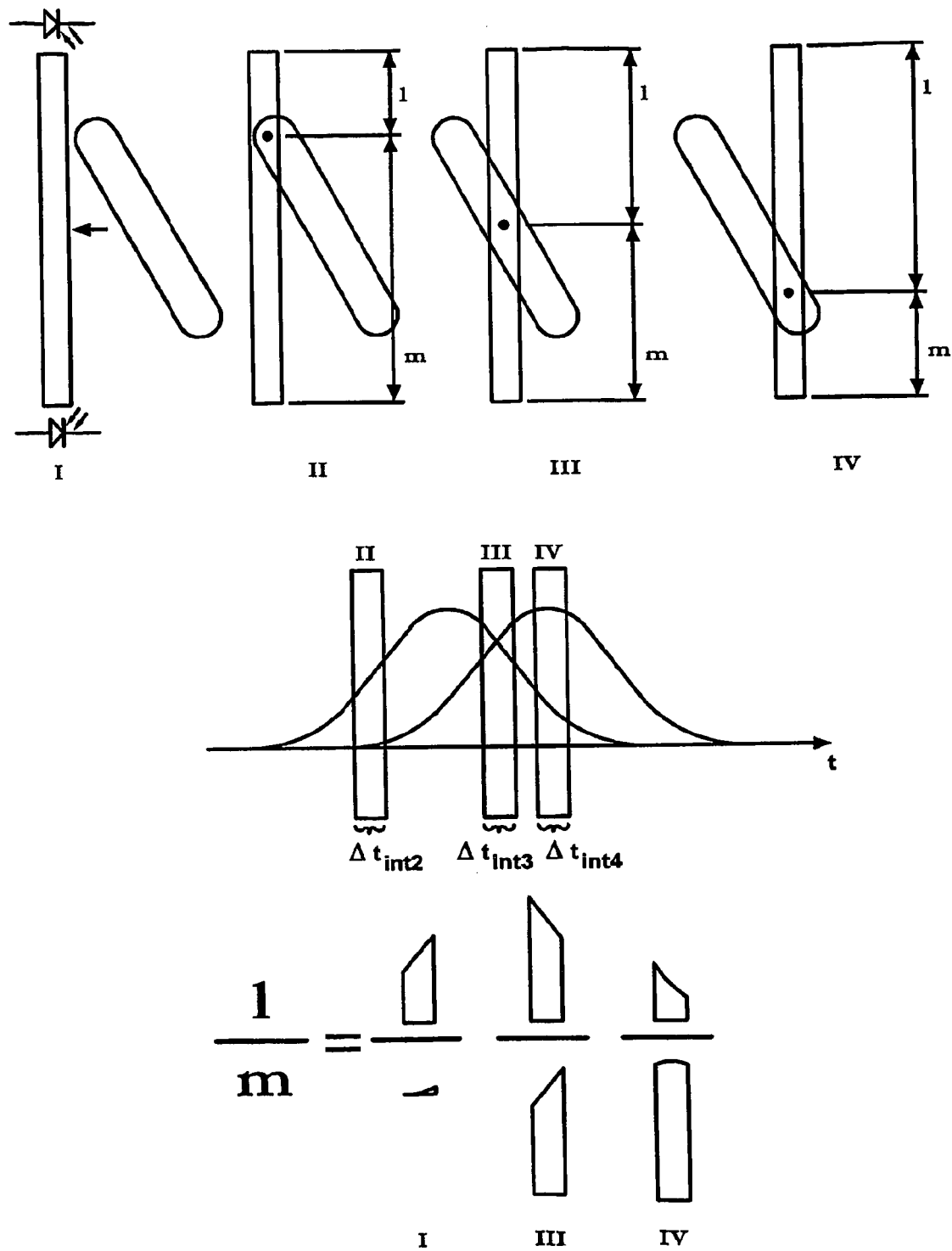
Figure 4B:
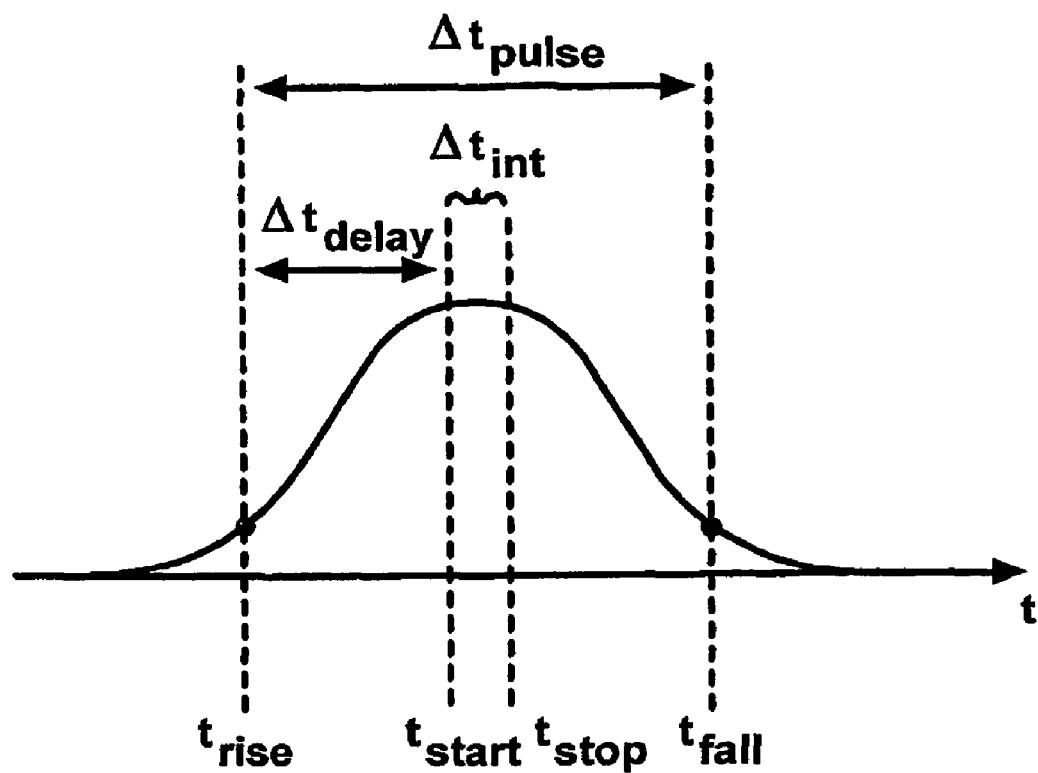

FIG. 2 shows how light beam detector elements 112, 113 can be arranged on the front ends of a light conducting rod 114, while a calibration light source 111 couples centrally into the beam detector;

FIG. 3 shows real signals, how they are received with a device according to the invention, namely as an upper track, a detected signal, and as a lower track, the door opening time delayed towards the beam center, as preferred;

FIG. 4 shows the sweeping of a beam profile (upper line) drawn boldly in length and hence astigmatic, lying obliquely to the receiver, and sweeping it, the signals received here on the two detector elements, with assigned integration surfaces (second line), and the ratio of the integration surfaces of the first to the second signal for the different integration window positions II, III, IV;

FIG. 4b shows the displacement of an integration window towards the beam center due to a delay in the door opening relative to the passage of the leading edge when the beam arrives by a delay $\Delta t_{delay}$.

Figure 1:
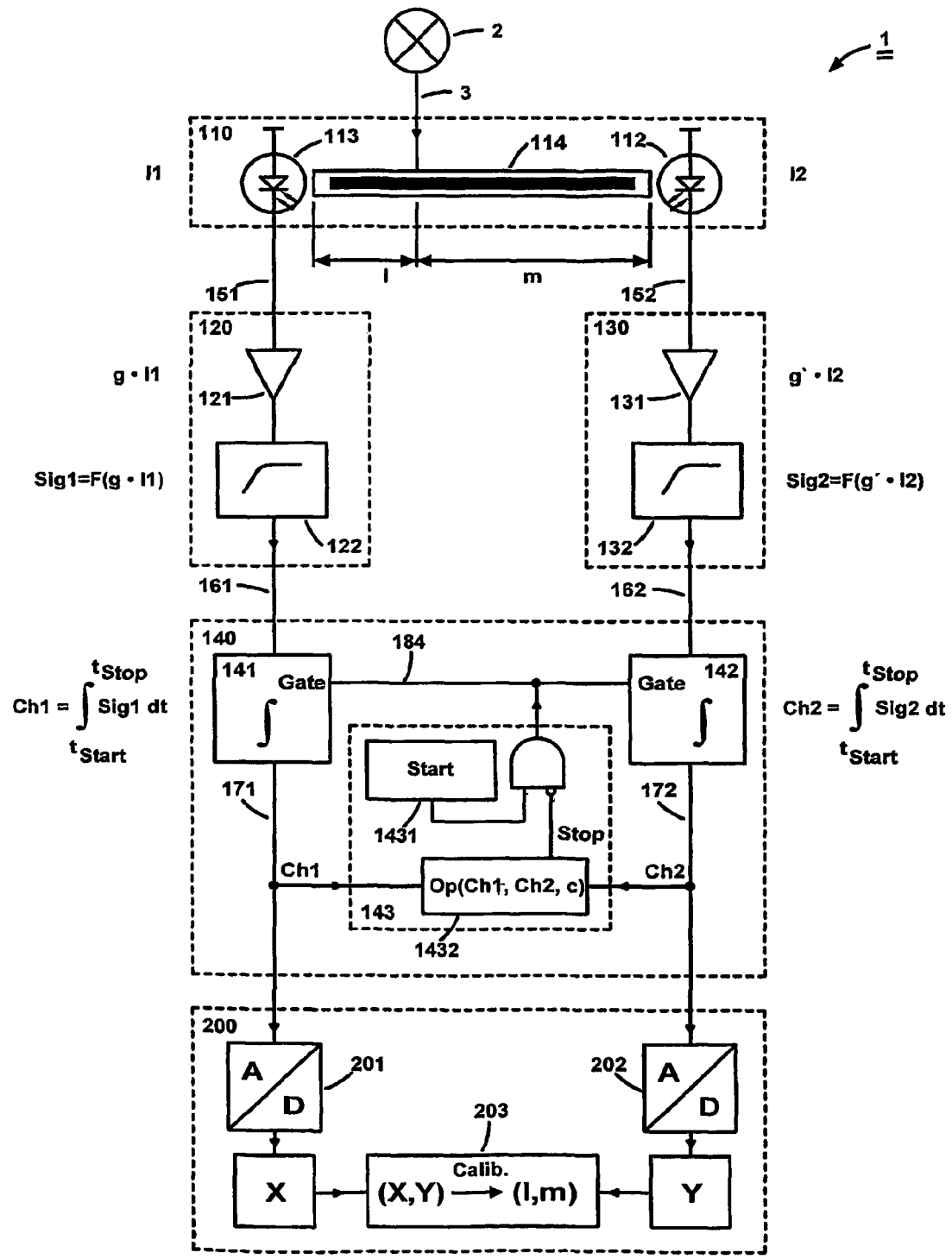
FIG. 1 shows a block diagram of a light beam receiver according to the invention; with the components of light beam detector element, amplifier, high pass filter, integrator, comparator with assigned integration time termination, analog-digital converter and evaluation component.

According to FIG. 1, a light beam receiver 1, generally denoted by 1, for analyzing a reception of a light beam 3, comprises a light beam detector device 110, which in turn comprises several detector elements 112, 113 and integrators 141, 142 for light beam element based signals, a signal integral limiting integration time control system 143 being assigned to at least two, and therefore in this case all integrators 141, 142, so that the analysis of the light beam reception is made possible in response to integrator signals 171, 172 evaluated in relation to each other, compare component 200 in FIG. 1.

Figure 1A:
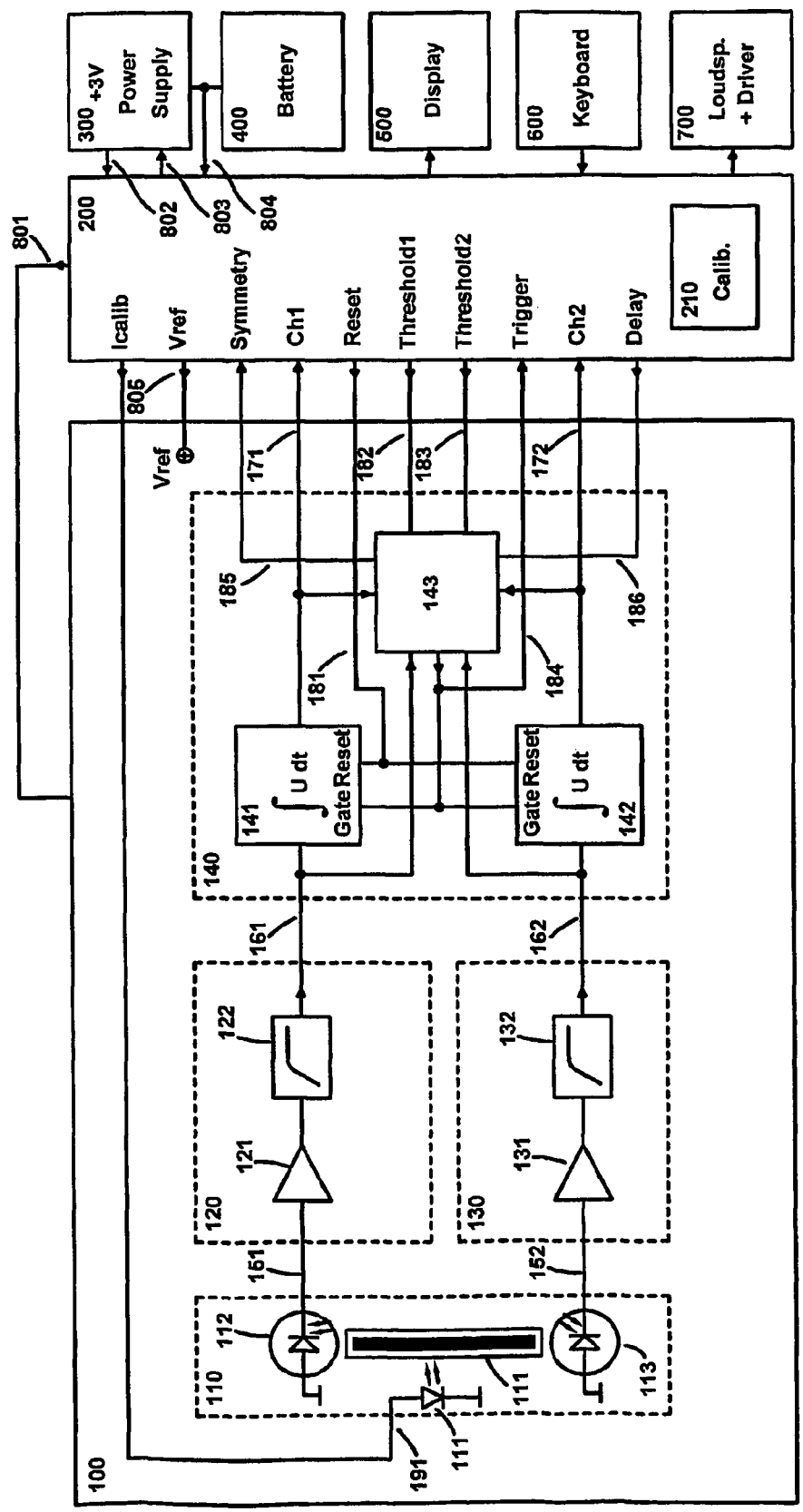
FIG. 1a shows, partially in block diagram form, how a preferred light beam receiver according to FIG. 1 is provided with a suitable periphery for display, operation and voltage supply, and how it is realized using digital components.

The light beam receiver 1 in FIG. 1a is in this example designed as a hand receiver which accordingly has a battery supply and local control elements, etc., as denoted in FIG. 1a by the reference numbers 300, 400, 500, 600 and 700, as well as a calibration data memory 210, which each denote energy source 300 with voltage regulation, a battery or storage battery 400, a display 500, an input keyboard 600 and a signalling unit which may be designed, for example, as a speaker, and is denoted by 700, and is designed for signalling beam incidence that is central, too high or too low, e.g., by tone modulation and pitch variation.

Furthermore, a calibration unit is assigned in the exemplary embodiment to the light beam receiver, which is designed according to FIG. 1a with a light emitting diode 111, which is supplied with power by a signal 191 with an evaluation and control unit and is designed and arranged to emit light in a known position between detector elements 112, 113, so that essentially the same proportions of light are received by both detector elements so that time-based or temperature-based variations and similar may be produced on the relevant detectors 112, 113.

The light beam emitting source 2 is shown in FIG. 1 as a bulb in the drawing, purely for easier recognition, but generally it will emit a sharply defined light beam and, in particular, it will be generated by a laser, particularly a rotary laser, as is normal practice on construction sites.

Such rotary lasers may have different designs. It is pointed out, in particular, use can be made of the rotary lasers such as those described in PCT/EP 01/08841. The receiver may easily be designed for evaluating the beams emitted shortly one after the other in such lasers; in particular integration times, delays etc. may be determined separately for each beam and/or the same delays, amplifications, etc. may be used, for simplification, for all beams which reach the receiver grouped closely one behind the other.

At the light receiver, the light beam 3 will hit a light conducting rod 114, where light will reach light detectors 112, 113 fastened to the end faces of a light-conducting rod 114 from the point of incidence due to internal total reflection and propagation. The intensity of the light proportions reaching light beam detector elements 112, 113 depends here on how close to light beam detector elements 112, 113 light beam 3 hits light conducting rod 114. In the exemplary embodiment shown, light beam 3 hits light conducting rod 114 closer to light beam detector element 13 than to light beam detector element 112. This can be seen on the different sections l and m, which run from the point of incidence to the relevant front face. In the exemplary embodiment shown, it is assumed that the intensity of the light received on the light beam detector element is a measure of the distance of the point of incidence of light beam 3 on the light conducting rod 114 from the relevant end faces. For this it is not absolutely essential to have a linear relationship between the light intensity on the light beam detector elements and the proportion of the point of incidence to the length of the rod. However, for the purpose of this explanation this may easily be assumed, even if, in the case of highly absorbent rods, for example, absorption effects may be produced over the running length of any exponential attenuation, or if there may be a deviation from linearity for other reasons. However, it should be mentioned that such cases can generally be detected by a suitable evaluation or calibration. If necessary, several calibration sources, corresponding to light emitting diode 111 or the like, may be used to determine non-linearities.

Light beam detector elements 112, 113 are arranged on the end faces of light emitting rod 114 so that they receive light coupled into the bar and are able to convert it to electrical signals. In the exemplary embodiment shown, these are light-sensitive photodiodes, for example. The signals denoted as I1 and I2 in FIG. 1, from light beam detector elements 113, 112, are then conditioned, i.e., first amplified in an amplification stage 121, 131 and, if necessary, impedance converted, and then pass through a filter 122, 132, which in the exemplary embodiment shown, is formed as a high pass filter and is suitable for filtering out light fluctuations due to the AC frequency of artificial lighting, and for detecting only the higher frequency signal components of a rotary laser rotating at sufficient speed.

The conditioned and filtered signal, denoted in FIG. 1 as Sig1 and Sig2, is then fed to integrators 141, 142 in order to integrate the signal intensity over time. Such integration circuits are known per se. The integrators are in this case controllable, i.e., the starting time at which the integration commences, and the time of terminations may be predetermined from outside. In a simple variant the start time is selected depending on the rising edge, so that integration does not commence until a certain threshold value is reached. This prevents noise of varying volume on both channels, which would be included in the considerations for a prolonged period, from resulting in major signal falsifications. In a preferred variant, the start time could, moreover, be delayed relative to the edge rise, as will be explained later with reference to FIGS. 4 and 4b.

In order to limit the integration time, an integration time termination is assigned to integrator unit 140, which contains integrators 141, 142, among other things. In the exemplary embodiment shown this takes place by feeding the corresponding integrated analog signals 171, 172 into a comparator 1432, in which it is compared whether one of the integral values has reached or exceed a certain threshold c. It should be mentioned that an alternative interruption condition, for example, could also be whether a function such as the sum of both integrator signals has reached threshold c. As soon as such an excess is established, a stop signal is emitted to prevent further upward integration. If the stop signal is active, gate signal 184 of the integrators is deactivated. This can be achieved, for example, by opening a switch element that is to be integrated and allows signals to pass. This admission or gate circuit has the effect that the signal strength approaches c in one of the channels, in this case channel 1, because a stronger signal is present there in terms of the relation l<m, while in the other channel an integrator signal is received which is considerably smaller than c.

It should be mentioned that, in addition to pure threshold control for the limitation of integration time, a timer-controlled integration time limitation may be provided alternatively and/or additionally. This can prevent signals from being processed even though only an extremely weak signal is received or the integration is started by random light incidence, signal noise or similar but no relevant signal is actually present. In the case of additional integration time control, provision may also be made, alternatively and/or additionally, for integration to take place through several signal passages for repetitively received light beams, as is the case with rotary lasers. The advantage of this is that acceptable accuracies are still possible in terms of elevation determination, even over very long distances. For this purpose synchronization to a beam may be provided, for example, with a signal fed into the integrators only for a certain admission time during the expected signal passage. This allows a quasi lock-in behavior.

A suitable analog-digital converter 201, 202, which converts the integrated signal values to corresponding digital values, is connected in series to the integrators in the example embodiment shown in FIG. 1. The corresponding digital values are denoted by X and Y in FIG. 1, and it will be seen from the above that in this example X is approximately c, while y may be smaller. In order to determine the position of point of incidence 2 on light conducting 7 from the values X, Y obtained on the analog-digital converters, evaluation stage 200 comprises a calculation means 203, which evaluation stage is in this case formed by a general mathematical operation, for example. This may, for example, be a divisor stage, but it may also be formed by a difference stage with suitable standardization, i.e., calculating a value according to (X−Y)/(X+Y), for example; the latter variant has the particular advantage that independent signal amplitude values are still received for very weak signals on both channels. Moreover, in order to remove production or design conditioned linearity errors from the measured values, the calculation means may also take into account correction values from a calibration data memory 210. At the time of production these values are determined in a calibration device, then stored in calibration data memory 210.

The arrangement described is used as follows:

First a rotary laser is put into operation, i.e., is caused to emit a laser beam sweeping a surface that lies as exactly horizontal as possible. When the rotation has stabilized, laser light receiver 1 is brought into the beam plane. Laser light beam 3 now repeatedly hits a point on light conducting bar 114 that is indicative of the position of light conducting bar 114 relative to the horizontal plane swept by the laser beam. The incidence of light on light conducting bar 114 results in pulse-type signals on light beam detector elements 112, 113 situated on its end faces, which elements are applied to integrator stage 140 after amplification and frequency response conditioning in the filter stage. The conditioned signals are in this case admitted into both integrator channels for the first time as soon as a certain signal strength is exceeded in one of the two channels. If this is the case in one channel, not only one but the other channel is actively switched. The signals of both channels are now integrated until a certain threshold value c is exceeded at the integrator output of a channel, which is established in stage 1432. After this threshold is exceeded, it is established in stage 143 that the integration must be terminated and the input signal on both integrators correspondingly interrupted. Integrator outputs 171, 172 are then routed to analog-digital converters 201, 202, and corresponding digital values X, Y are determined. This can be achieved at a low sample rate since the signal is present for a long time. At the same time the accuracy of the analog-digital conversion can be increased without great expense. After the analog-digital conversion the integrator unit can be reset to enable the next passage to begin from an initial value of 0. The values X, Y obtained on the analog-digital converters are then settled in calculation means 203 and an indication value corresponding to the settlement value is emitted (compare reference number 500 in FIG. 1*a*).

This value may be indicative of the distance of the light beam detector center from the elevation swept by the light beam, or may indicate whether the center lies exactly on the swept plane.

Figure 1B:
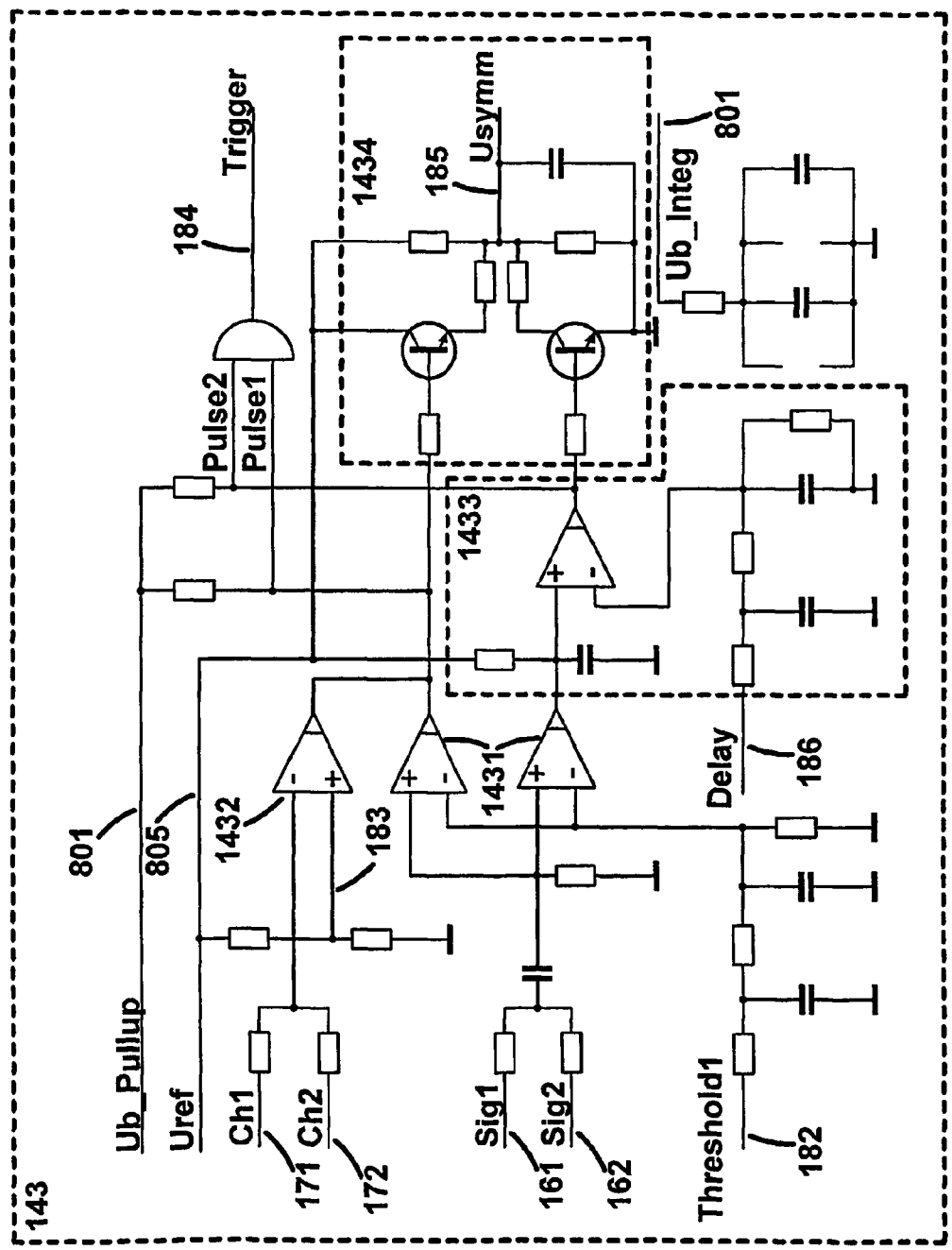
FIG. 1b shows, in further detail, details of FIG. 1a, namely block 143, which comprises the integration start and stop circuit.

It is pointed out that details of the individual signal conditioning stage described only in block form here may be deduced from FIGS. 1*a*, 1*b*. Here it is, moreover, not absolutely necessary to carry out signal filtering with bandwidth reduction. Nor is it necessary to choose integrated comparators for the triggering circuit, even though the use of integrated components is preferred.

Details of a possible design of the triggering circuit are shown in FIG. 1*b*, but the peculiar feature here is that the comparators 1431, 1432 shown are represented as comparators with open collector outputs.

The variant described with reference to FIG. 1 is extremely simple to construct and already prevents over-modulation, even in the case of strong irradiated signals. However, it is desirable, as described in the introduction, to provide signal integration that is symmetrical around the beam passage center. Why this is preferred is extremely easy to understand with reference to FIG. 4. There it is shown how the signals look when light conducting bar 114 is not struck by a circular shaped beam 3, but is swept by an elongated beam profile that also runs obliquely, here at an angle of approximately 45° to light conducting bar 114. The center of the area of incidence is initially seen in a phase II close to the upper detector element, in a central phase III in the center of the light conducting bar, and in an end phase IV close to the lower end of light conducting bar 114.

It is evident that the upper detector will receive the maximum of its signal earlier than the lower detector. This is shown in the central line of FIG. 4. If integration now commences as soon as the signal exceeds a certain threshold value in one of the detectors, it is clear that both the commencement of integration and the reaching of a final value are determined exclusively by the signals on the detector element which receives a strong signal earlier, i.e., the upper light detector element in the exemplary embodiment shown. Here the integral is large, while only a very small signal is received because of the phase shift of the lower detector element from there due to the oblique position of the beam. It is also evident that the same error would be made in the reverse direction if the delay after triggering the upper element were to be very long and an integration were to be carried out approximately during the integration period $\Delta t_{int3}$. Correct values are obtained, on the other hand, when measurement is carried out in the center of the beam passage, represented at $\Delta t_{int2}$. This gives, per se, the representative value of the beam elevation.

FIG. 4*b* now shows how such a preferred displacement of the integration time window can be achieved relative to an edge point. Such a displacement of the integration time window is possible if the integration no longer commences immediately when a given signal threshold is exceeded in the first of the two channels, but rather when a certain time, namely $\Delta t_{delay}$ has elapsed before commencing the integration for a time $\Delta t_{int}$.

This easily allows a determination of $\Delta t_{delay}$ when the irradiation is repeated with sufficient uniformity, which is the case in practice with conventional rotary lasers. On one hand the integration time $\Delta t_{int}$ can be determined in a first rotation passage I, and on the other hand the duration of pulse $\Delta t_{pulse}$ can be determined. The corresponding circuits are expanded for this purpose, preferably in at least one channel, by rising and falling edge detectors, and by a time measurement for measuring the time between these edges. In the exemplary embodiment shown in FIG. 4b, the pulse passage is represented as being very long, for reasons of clarity, which in practice need not necessarily be the case.

In the following passage it is then assumed that approximately the same beam duration will again be present, i.e., that the previously determined value $\Delta t_{pulse}$ of the beam passage time is again reached. It is also assumed that the expected integration time will remain approximately constant. Since the integration time typically depends on the irradiation intensity, and this irradiation intensity varies only slowly from beam passage to beam passage due to the high repetition frequencies of conventional construction lasers, even during movement of the light beam receiver, e.g., by an operator, this assumption is justified to a large extent. It will then immediately become clear that $\Delta t_{delay}$ can be assumed as corresponding to ½ $\Delta t_{pulse}$–½ $\Delta t_{int}$ from the last measurement. Exceeding the threshold value of the integration start may be delayed by this time. This provides at least approximately cyclic beam integration around the threshold center passage; approximately because no exact beam center position need be given for the passage concerned due to the reference to earlier passages.

In FIG. 1b the time delay is effected by means of a monostable flip-flop 1433 that can be programmed by a control voltage 186 of evaluation unit 200. The integration time control system 143 generates here, by means of a simple time measuring circuit 1434, a voltage 185, the value of which indicates the position of integration time $\Delta t_{int}$ within beam passage time $\Delta t_{pulse}$. The evaluation unit then uses this voltage to generate a new control voltage 186 for the next event.

So far it has merely been mentioned that the delay is effected by means of a separate timing element 1433. However, a delay may also be achieved adaptively increasing the triggering threshold for $t_{rise}$. In FIG. 4b it is adaptively increased until $t_{rise}$ and $t_{start}$ converge in time, because an increase in the triggering threshold also delays the integration start. This is possible in the case of signal pulses with a Gaussian curve shape or similar. Moreover, in order to integrate more complex signal pulses, as shown in FIG. 3, exactly in the center, a separate delay element may be provided, as shown in FIG. 1b.

It is pointed out that while the description is given above for only two light detector elements, and these are, moreover, described as being arranged on a light conducting rod, this need not necessarily be the case. A multitude of light detectors may be used, arrangements can be used without a light conducting rod, and it is not absolutely necessary to use repetitive beams.

The invention claimed is:

1. A light beam receiver for analyzing light beam reception with multiple light beam detector elements and integrators for light beam detector element based signals, characterized in that a signal integral limiting integration time control system is assigned to at least two integrators so that the analysis of the light beam reception is made possible in response to integrator signals evaluated in relation to each other;
   wherein said signal integral limiting integration time control system dynamically controls a time interval for which said at least two integrators perform integration of signals, based upon an integral value of an intensity of said received light beam, and thereby prevents said at least two integrators from saturating during said analysis of said received light beam.

2. The light beam receiver according to claim 1, characterized in that at least one pair of light beam detector elements is formed as position-sensitive elements.

3. The light beam receiver according to claim 1, characterized in that the light beam detector elements are spaced apart.

4. The light beam receiver according to claim 3, characterized in that the light beam detectors spaced apart are provided at opposite ends of a light conducting rod.

5. The light beam receiver according to claim 4, characterized in that the light conducting rod is designed for laterally coupling of the light beam to be received.

6. The light beam receiver according to claim 1, characterized in that it is designed to evaluate a repetitively, temporarily received light beam emitted, in particular, by a rotary laser light source.

7. The light beam receiver according to claim 1, characterized in that at least one of an (a) amplification stage and (b) a frequency filtering stage is arranged between the light detector elements and the integrators.

8. The light beam receiver according to claim 1, characterized in that a separate integrator of said integrators is assigned to each of said light beam detector elements.

9. The light beam receiver according to claim 1, characterized in that at least two integrators of said integrators are synchronised to each other so that they can be jointly activated and deactivated.

10. The light beam receiver according to claim 1, characterized in that in the case of a beam moved above the light detector elements, a beam center detection system is provided for at least approximately symmetrical signal integration around the beam center passage.

11. The light beam receiver according to claim 1, characterized in that the integration control system is designed as a gate control system admitting signals: (a) only temporarily, or (b) only conditionally, or (c) only temporarily and conditionally.

12. The light beam receiver according to claim 11, for light beams repetitively sweeping the light beam detector elements, characterized in that the gate control system is: (a) designed to take into account recent gate opening times, or (b) designed to take into account a repetition frequency, or (c) designed to take into account both recent gate opening times and a repetition frequency.

13. The light beam receiver according to claim 1, characterized in that the integration control system is designed to admit signals to be integrated for a time which is short compared to an individual irradiation that may be repetitive.

14. The light beam receiver according to claim 1 characterized in that an evaluation means is provided for carrying out the analysis.

15. The light beam receiver according to claim 1, characterized in that the evaluation means is provided for: (a) beam elevation, or (b) beam center determination, or (c) both beam elevation and beam center determination.

16. The light beam receiver according to claim 1, characterized in that the evaluation means is designed for: (a) forming integrator signal differences, or (b) forming integrator signal quotients, or (c) forming both integrator signal differences and integrator signal quotients, for analyzing the light beam reception.

17. The light beam receiver according to claim 1, characterized in that the evaluation means has an ADC (analog to digital converter) stage enabling analog signals converted to digital values to be reconciled with each other and associated in logical form.

18. A light beam receiver for analyzing light beam reception, said light beam receiver comprising:
   a plurality of light beam detector elements;
   a plurality of integrator circuits that receive signals from said light beam detector elements, and which output a plurality of integrator signals; and
   a signal integral limiting integration time controller that is in communication with at least two of said plurality of integrator circuits so that an analysis of the light beam reception is determined, in response to said plurality of integrator signals, which are evaluated in relation to each other;
   wherein said signal integral limiting integration time controller terminates an integrating function of said plurality of integrator circuits, using a stop signal that is generated by said signal integral limiting integration time controller, which is based upon an output value of at least one of said plurality of integrator signals.

19. A light beam receiver for analyzing light beam reception, said light beam receiver comprising:
   a plurality of light beam detector elements that generate output signals when receiving a light beam upon said light beam detector elements;
   an evaluation/control circuit that receives said output signals and is configured to substantially determine a position where said light beam impacts with respect to said plurality of light beam detector elements; and
   at least one calibration light source that, under the control of said evaluation/control circuit, emits at least one light pulse that is coupled to said plurality of light beam detector elements, in which said at least one calibration light source is included as an integral part of said light beam receiver;
   wherein said light beam receiver performs a self-calibration function by use of said at least one calibration light source, which illuminates at least two of said plurality of light beam detector elements during at least a portion said self-calibration function.

20. The light beam receiver as recited in claim 19, wherein said self-calibration function is performed in a substantially continuous mode of operation.

21. The light beam receiver as recited in claim 19, wherein said at least one calibration light source is arranged so that its emitted light is received by at least two of said plurality of light beam detector elements that are arranged at a distance from each other.

22. The light beam receiver as recited in claim 21, further comprising a light conducting rod that receives said light beam, said light conducting rod having at least two different distal ends; wherein:
   said at least two of said plurality of light beam detector elements are positioned at said at least two different distal ends of said light conducting rod, and
   said at least one calibration light source is positioned between said at least two different distal ends.

23. The light beam receiver as recited in claim 21,
   wherein said at least two of said plurality of light beam detector elements are arranged to provide a spatial detection area without a light conducting rod, and
   said at least one calibration light source is positioned along said spatial detection area, and between said at least two of said plurality of light beam detector elements.

24. The light beam receiver as recited in claim 19, wherein said at least one calibration light source is fixed at a predetermined position, and is not movable with respect to said at least two of the plurality of light beam detector elements.

25. The light beam receiver as recited in claim 18, wherein said stop signal occurs when at least one of said plurality of integrator signals reaches a predetermined threshold value.

26. The light beam receiver as recited in claim 18, wherein said stop signal occurs when a sum of two of said at least one of said plurality of integrator signals reaches a predetermined threshold value.

\* \* \* \* \*